United States Patent
Yuang et al.

(10) Patent No.: US 6,480,902 B1
(45) Date of Patent: Nov. 12, 2002

(54) INTERMEDIA SYNCHRONIZATION SYSTEM FOR COMMUNICATING MULTIMEDIA DATA IN A COMPUTER NETWORK

(75) Inventors: Maria C. Yuang, Hsinchu (TW); Po-Lung Tien, Hsinchu (TW); Yu-Guo Chen, Tainan (TW)

(73) Assignee: Institute for Information Industry, Taipei (TW)

(*) Notice: Subject to any disclaimer, the term of this patent is extended or adjusted under 35 U.S.C. 154(b) by 0 days.

(21) Appl. No.: 09/318,255

(22) Filed: May 25, 1999

(51) Int. Cl.[7] .............................................. G06F 15/16
(52) U.S. Cl. ........................ 709/248; 709/200; 709/231; 709/236; 348/500; 348/512; 348/513; 348/515; 348/423.1
(58) Field of Search ................................. 709/200–203, 709/217–219, 231, 236, 247–248; 348/500, 512–513, 515, 423.1

(56) References Cited

U.S. PATENT DOCUMENTS

| | | | | |
|---|---|---|---|---|
| 5,642,171 A | * | 6/1997 | Baumgartner et al. | 348/515 |
| 5,737,531 A | * | 4/1998 | Ehley | 709/231 |
| 5,768,535 A | * | 6/1998 | Chaddha et al. | 709/247 |
| 5,959,684 A | * | 9/1999 | Tan et al. | 348/515 |
| 6,016,166 A | * | 1/2000 | Huang et al. | 348/515 |
| 6,141,693 A | * | 10/2000 | Perlman et al. | 709/236 |
| 6,148,135 A | * | 11/2000 | Suzuki | 348/512 |
| 6,154,771 A | * | 11/2000 | Rangan et al. | 709/217 |
| 6,262,776 B1 | * | 7/2001 | Griffits | 348/512 |
| 6,262,777 B1 | * | 7/2001 | Brewer et al. | 348/515 |
| 6,415,326 B1 | * | 7/2002 | Gupta et al. | 709/231 |

* cited by examiner

Primary Examiner—Bharat Barot
(74) Attorney, Agent, or Firm—Nath & Associates PLLC; Harold L. Novick; Marvin C. Berkowitz

(57) ABSTRACT

The inventive system mainly includes a synchronization marker at a transmitting site and a synchronization forcer at a receiving site connecting to each other via computer networks. The synchronization marker performs the sequential mark marking of frames per every marking interval. The synchronization forcer regulates the play time of the audio signals and their corresponding video signals according to their sequential marks. The inventive system can determine precisely about the minimum marking interval yielding a bounded skew requirement. Consequently, the invention satisfies any given skew requirement under various buffer size and traffic arrivals while imposing minimal overhead.

17 Claims, 3 Drawing Sheets

INTERMEDIA SYNCHRONIZATION SYSTEM FOR COMMUNICATING MULTIMEDIA DATA IN A COMPUTER NETWORK

BACKGROUND OF THE INVENTION

A. Field of the Invention

The present invention relates to a system for multimedia communication, specially to an intermedia synchronization system with bounded skew guarantee to transmit multimedia data streams according to sequential marks.

B. Description of the Prior Art

Recent development in high-speed communication technology allows the multimedia communication to grow rapidly. Multimedia information including text, graphics, images, voice, animation, and full-motion video now can be accessed in a relatively fast speed.

Conventional multimedia transmission uses only one network connection for transmitting multimedia data streams regardless of the differences in data types. It is known that video frames are usually much more larger than audio frames. To establish a smooth connection, video frames require about 3 mega bps (bits per second) for transmission while audio frames only 64 K bps. Thus, if we want to use a network connection to transmit video and audio signals simultaneously with a guaranteed quality, we will need a bandwidth of about 3M plus 64 k bps, that is, 3.5 M bps. Such a large bandwidth can only be provided by a dedicated high speed network which is very expensive.

To save the cost and utilize the bandwidth of the networks more efficiently, clients may rent different dedicated network connections with acceptable bandwidths and prices for transmitting audio frames and video frames separately. However, when two or more correlated media are distinctively transported over the networks, the intermedia synchronization problems may occur. That is, the arrival time for the correlated media at the receiving site may be different due to several factors, such as, current network condition, the speed of transmission, and data size.

The three most popular approaches for solving intermedia synchronization problem include: feedback-based, time-stamped-based, and sequence-marking-based approaches. Feedback-based approach performs intermedia synchronization based on feedback packets that are periodically sent back to the sending site so that the number of retrieval times and compensation for the network jitter can be calculated. The time-stamped-based approach utilizes the time stamp recorded in each frame to rearrange its sequence before it is played out. In general, the disadvantage for the feedback-based approach is that it is not fast enough for real-time transmission. On the other hand, the time-stamped-based approach requires drastic computation and very often results in frame overhead.

In contrast, the sequence-marking-based approach employs rather streamlined time stamps referred to as sequential marks. This approach is simple for implementation and practical in application. However, the determination on marking frequency has been a compromise issue between skew assurance and computing overhead.

SUMMARY OF THE INVENTION

Accordingly, it is an object of the present invention to provide an intermedia synchronization system with bounded skew guarantee which can transmit multimedia data streams over different network connections with minimum overhead.

It is a further object of the present invention to provide an intermedia synchronization system which allows users to rent network connections of suitable bandwidths and prices without suffering from the quality of service on networks.

Accordingly, the system of the invention mainly includes: a synchronization marker at a transmitting site and a synchronization forcer at a receiving site connecting to each other via computer networks. The synchronization marker performs the sequential marking of frames per every marking interval. The synchronization forcer regulates the play time of the audio signals and their corresponding video signals according to their sequential marks. The inventive system can determine precisely about the minimum marking interval yielding a bounded skew requirement. The skew is first formulated as a function of scene pause (video frame lack) and scene leap (video frame loss), which are in turn derived by means of an Markov Batch Bernoulli arrival process D/K/1 (hereinafter referred to as MBBP/D/K/1) queuing model assuming the Markov Batch Bernoulli arrival process (hereinafter referred to as MBBP). Analytical results have shown that skew increases when the buffer size and the burst of the arrival traffic increase and vice versa. Consequently, the invention satisfies any given skew requirement under various buffer size and traffic arrivals while imposing minimal overhead.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

A preferred embodiment of the invention is described below. This embodiment is exemplary. Those skilled in the art will appreciate that changes can be made to the disclosed embodiment without departing from the spirit and scope of the invention.

Figure 1:
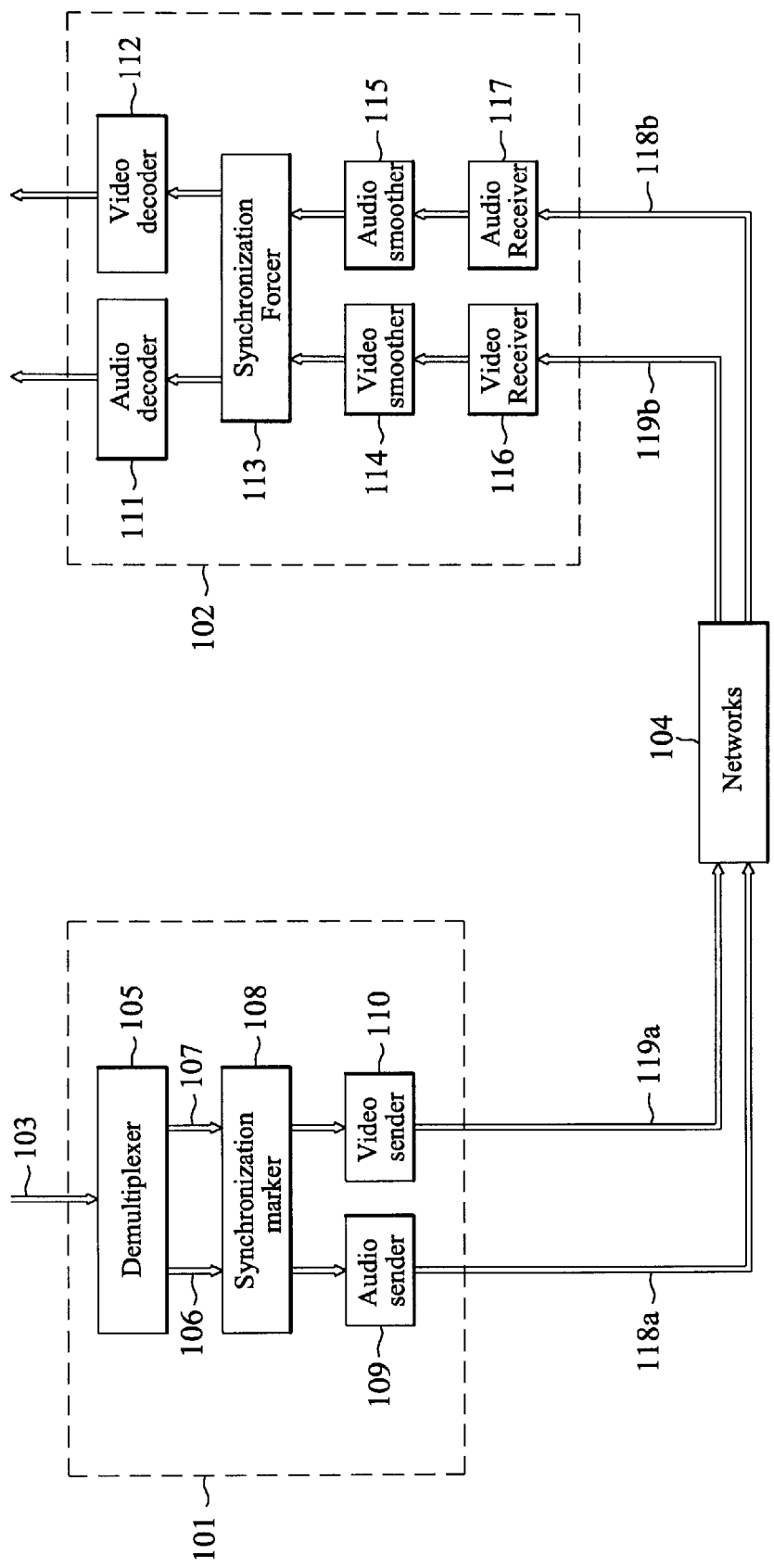
FIG. 1 is a schematic diagram showing the architecture according to the system of the present invention.

The architecture of the invention is shown in FIG. 1. The inventive system mainly includes a synchronization marker 108 of transmitting means 101 at the transmission site, and a Synchronization forcer 113 of receiving means 102 at the receiving site 112. They are connected together via high speed networks 104, such as an Asynchronous Transfer Mode (ATM), T1, Ethernet, 100 VG-AnyLAN or ISDN.

The transmitting means 101 which is implemented in an end user system includes: demultiplexer 105, synchronization marker 108, audio sender 109 and video sender 110. When transmitting MPEG-2 data, the demultiplexer 105 receives MPEG-2 multimedia data streams 103 and demultiplexes the MPEG-2 multimedia data streams 103 into video frame 106 and audio frame 107. After demultiplexing, the video frame 106 and the audio frame 107 will be forwarded to synchronization maker 108 to get marks. It should be noticed that the transmitting means 101 is not restricted in transmitting MPEG-2 data streams. When the data stream is not in MPEG format, then the demultiplexer 105 can be omitted.

The synchronization marker 108 determines a marking interval based on the arrival time of each audio frame. The determination on the duration of the marking interval is a compromise issue between the synchronization results and frame overhead. During each marking interval, the synchronization marker 108 will tag a sequential mark onto the corresponding audio and video frames as shown in FIG. 2.

Figure 2:
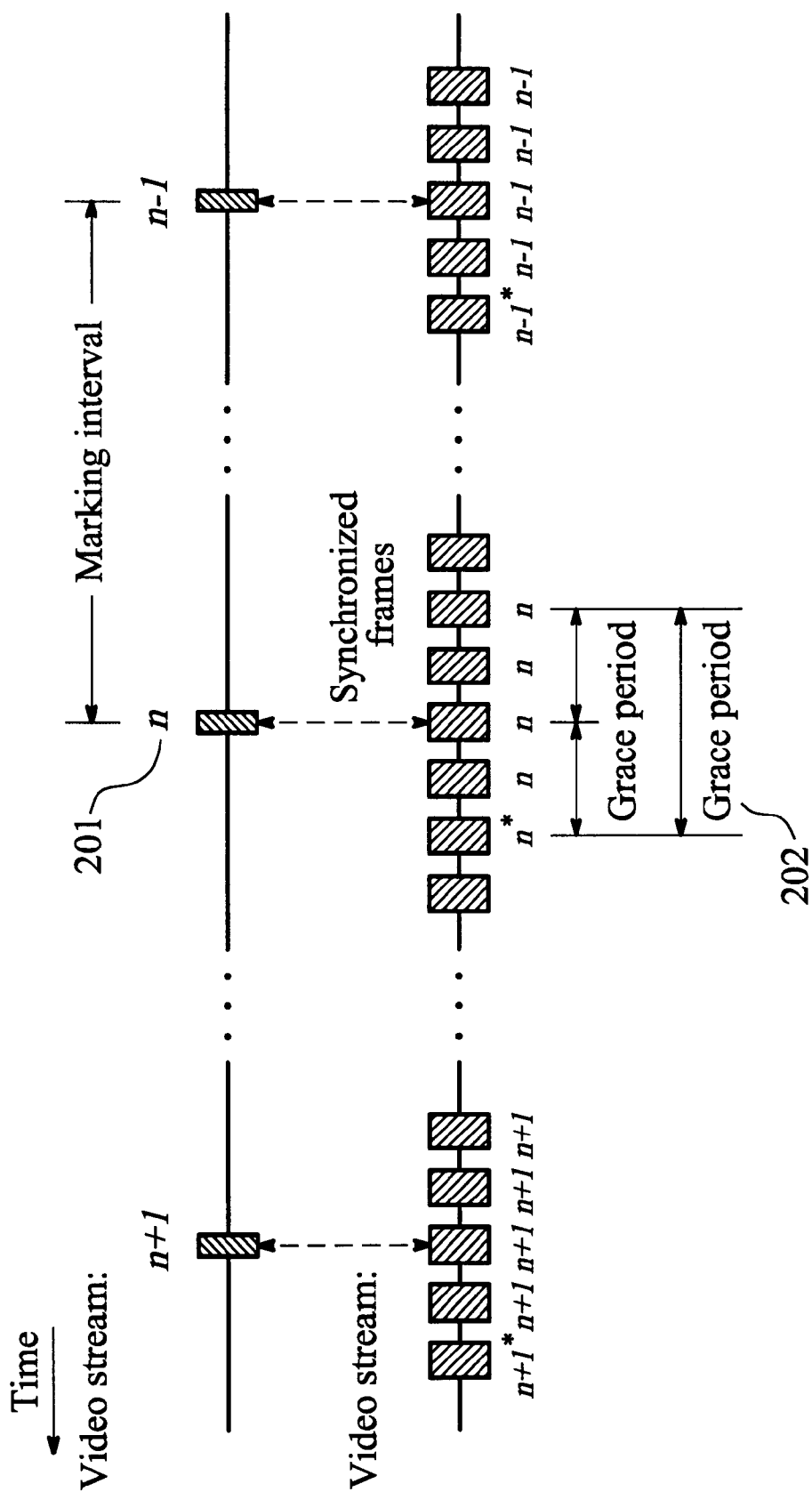
FIG. 2 is a schematic diagram showing the marking of audio and video frames in the synchronization marker according to the preferred embodiment of the invention.

Refer to FIG. 2, the object of the synchronization marker 108 is to determine the minimum marking interval satisfying a given bounded skew. Moreover, for minimizing the buffering delay of video and audio frames, an extra tolerable skew, referred to as the grace period 202, is allowed during frame synchronization. According to the grace period 202, one audio frame is associated with a set of video frames. Those video frames of the same set are then tagged with the same marks as shown in FIG. 2. For example, the audio frame 201 marked with sequential mark n is expected to be played back with any one of the video frames 203 tagged with sequential mark n within the grace period 202. Usually, the size of the acceptable grace period 202 depends on application and normally falls within the region from 80 ms to 160 ms.

Refer to FIG. 1 again. The marked audio frames will be sent to a network connection 118a via Audio sender 109. On the other hand, the marked video frames will be sent to a network connection 119a via video sender 110. At the receiving site, the audio receiver 117 in the receiving means 102 receives marked audio frames from a network connection 119b. The video receiver 116 in the receiving means 102 receives video streams from a network connection 119b. The audio receiver 117 will forward the marked audio frames to audio smoother 115. The video receiver 116 will forward the marked video frames to the video smoother 114. The network connections 119a, 119b, 118a and 118b can be Constant Bit Rate (CBR) or Variable Bite Rate (VBR) connections.

If the transmission is via Constant Bit Rate, then the data streams received do not have to be processed by the video smoother 114 or the audio smoother 115. However, if the transmission is not via Constant Bit Rate, the data streams received must be processed by the video smoother 114 or the audio smoother 115 before it is sent to the synchronization forcer 113. The video smoother 114 and the audio smoother 115 are responsible for optimizing the frame condition and restoring fidelity before they are sent to the synchronization forcer 113. The audio smoother 115 mainly consists of a buffer (not shown), Constant Bit Rate Enforcer (not shown) and a network traffic predictor (not shown) which is based on a neural network. The audio smoother 115 can determine an adaptive buffering delay imposed on each talkspurt, thereby to regulate the departure time of each audio frame.

The synchronization forcer 113 receives the marked audio frames and marked video frames from the audio smoother 115 and video smoother 114 or directly from the video receiver 116 and the audio receiver 117. The object of the synchronization forcer 113 is to rearrange the display sequences of the video signals and audio signals according to their sequential marks. For instance, the audio frames are supposed to be always on time. If a video frame arrives earlier than its corresponding audio frame, then the video frame will be buffered. If a video frame is late, the video frame may be flushed away from the decoder buffer.

The synchronization forcer 113 applies near-nonblocking playout for audio frames and blocking playout for video frames. This can be examined from two extreme cases. In the first case, if an entire set of video frames arrive earlier than their corresponding audio frame, the playout blocking is applied to the last video frame of the set (marked with '*' in FIG. 2). The reason is to prevent video frames from being buffered too long. In the second extreme case, if the entire set of video frames arrive later than their corresponding audio frame, the audio frame is released as soon as either predetermined maximum tolerable delay times out or the first video frame in the set has arrived. This can prevent the audio frames from being buffered too long and in a severe destruction of playout smoothness.

Figure 3:
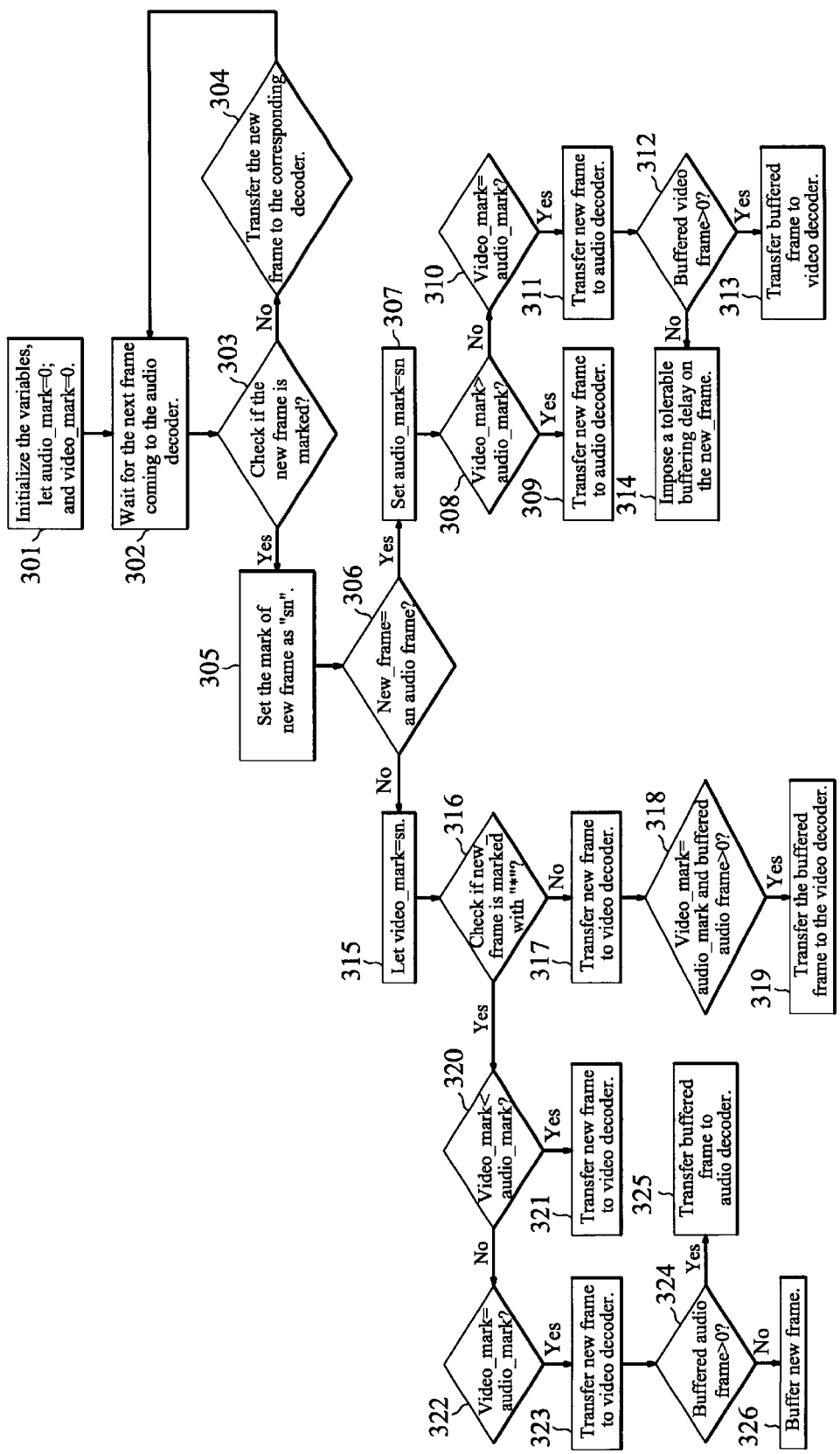
FIG. 3 is a flow chart showing the synchronization process for the synchronization forcer according to the preferred embodiment of the invention.

The process of the synchronization forcer 113 is illustrated in FIG. 3. Let audio_mark be the sequential mark of the last arriving audio frame, video_mark be the sequential mark of the last arriving video frame.

Step 301: Initialize the variables of audio_mark and video_mark. Let audio_mark=0; and video_mark=0.

Step 302: Wait for the next frame to come.

Step 303: Check if the new frame is an audio frame? If yes, go to step 304. If not, go to step 314.

Step 304: Check if there is any buffered audio frame? If yes, go to step 305. If not, go to step 306.

Step 305: Buffer this audio frame and go to step 302.

Step 306: Check if this new frame is marked? If yes, go to step 308. If not, go to step 307.

Step 307: Transfer this new frame to the audio decoder and go to step 302.

Step 308: Set audio_mark;

Step 309: Check if video_mark=audio_mark? If yes, go to step 311. If not, go to step 310.

Step 310: Impose a tolerable buffering delay on this audio frame and go to step 302.

Step 311: Transfer this new frame to audio decoder.

Step 312: Check if there is any buffered video frames? If yes, go to step 313. If not, go to step 302.

Step 313: Transfer those buffered video frames which are with sequence numbers less than or equal to audio_mark or are not marked. Then, go to step 302.

Step 314: Check if there is any buffered video frame? If yes, go to step 315. If not, go to step 316.

Step 315: Buffer this video frame and go to step 302.

Step 316: Check if this new frame is marked? If yes, go to step 318. If not, go to step 317.

Step 317: Transfer the new frame to video decoder and go to step 317.

Step 318: Set video_mark and go to step 319.

Step 319: Check if this new frame is marked with "*"? If yes, go to step 320.

If not, go to step 322.

Step 320: Determine if audio_mark>=video_mark? If yes, go to step 322. If not, go to step 321.

Step 321: Buffer this video frame and go to step 302.

Step 322: Transfer this new frame to audio decoder.

Step 323: Check if there is any buffered audio frames? If yes, go to step 324.

If not, go to step 302.

Step 324: Transfer those buffered audio frames which have sequence numbers less than or equal to video_mark or are not marked. And then go to step 302.

Refer to FIG. 1 again. After the synchronization process, the audio decoder 111 receives the synchronized audio frames from the synchronization forcer 113 and generating regular audio signals ready to be played out by a speaker or amplifier. The video decoder 112 receives the synchronized video frames from the synchronization forcer 113 and generating regular video signals ready to be played out by a monitor of a personal computer or camcorder.

During the playout of video frames, the decoder buffer may encounter underflow and overflow problems, resulting in the deterioration of playout quality. In particular, if the decoder buffer underflows, the previous frame is replayed back which is referred to as the "scene pause". On the other hand, if the decoder buffer overflows, then the frames will be lost which is referred to as "scene leap". To guarantee a bounded skew, we have to find out the minimum marking interval yielding a bounded skew requirement. The skew is first formulated as a function of scene pause (frame lack) and scene leap (frame loss), which are in turn derived by means of an Markov Batch Bernoulli arrival process D/K/1 (hereinafter referred to as MBBP/D/K/1) queuing model assuming the Markov Batch Bernoulli arrival process (hereinafter referred to as MBBP).

Let P(n) and L(n) be the mean total number of scene pauses and leaps, respectively, up to the nth frame time from the synchronization point. The mean skew between video and audio at the nth frame time, defined as S(n), can thus be formulated as:

$$S(n)=P(n)-L(n). \quad (1)$$

The positive values of S(n) correspond to slower video frames (than audio frames), while negative values of S(n) correspond to faster video frames.

Assuming that the Earliest Frame Drop (EFD) queuing principle is employed. Then, counting from the synchronization point, the nth video frame being played back is on average the (n−S(n)) the frame originally captured. Let $\tau$ denote the maximum tolerable mean skew (in seconds) between video and audio frames, and $t_f^v$ ($t_f^a$) be the length of the video and audio frame time (in seconds). If N is the maximum integer such that $$S(n) \times t_f^v \leq \tau, \forall_n \leq N, \quad (2)$$

the minimum marking interval (in the unit of the audio frame time) denoted as $I_{min}$, satisfying $\tau$ r can simply be concluded as $$I_{min} = \left\lfloor \frac{(N - S(N)) \times t_v^f}{t_a^f} \right\rfloor. \quad (3)$$

Therefore, from equation (1)-(3) $I_{min}$ can be determined by P(n) and L(n), which can be further derived from the MBBP/D/K/1 queuing model.

Experiment results shows that both the scene pause and scene leap decline as the buffer size increases. However, the playout quality quantified by skew deteriorates with large buffer sizes. Consequently, the bounded skew formula of the present invention help to determine an optimal buffer size with a minimum of scene pause and leap, thereby to get satisfactory skew and quality. We conclude that the playout quality with respect to scene pause, scene leap, and skew, depends on the burst of frame arrivals and the size of the decoder buffer. The playout quality degrades when the burst rate is high and the buffer size is large, and vice versa.

The data frames described in the preferred embodiment of the present invention are not to restrict the scope of the invention. Other data frames and data type can also be used. Moreover, the number of connections is not restricted to two. For instance, when text data frame is included, the number of network connections can increase to three. It should be understood that various alternatives to the structures described herein might be employed in practicing the present invention. It is intended that the following claims define the invention and that the structure within the scope of these claims and their equivalents be covered thereby.

What is claimed is:

1. An intermedia synchronization system for communicating multimedia data streams between a transmitting site and a receiving site over a computer network, said multimedia data streams consisting of at least audio frames and video frames, comprising:

a synchronization marker at said transmitting site for generating marks for each of said audio frames and said video frames in response to a minimum marking interval for a bounded skew requirement, and forwarding said marked audio frames to a first network connection, said marked video frames to a second network connection, wherein said marking interval based on the arrival time of each audio frame; and a synchronization forcer at said receiving site for buffering said marked audio frames and said marked video frames based on the arrival time of each of said audio frames and rearranging the display sequences of said marked audio frames and said marked video frames according to their sequential marks.

2. The intermedia synchronization system as claimed in claim 1, wherein said first connection and said second connection are Constant Bit Rate network connections.

3. The intermedia synchronization system as claimed in claim 1, wherein said first connection and said second connection are Variable Bit Rate network connections.

4. The intermedia synchronization system as claimed in claim 1, further comprising:

an audio sender coupling to said first network connection for forwarding the outputs of said synchronization marker to said first network connection; and a video sender coupling to said second network connection for forwarding the outputs of said synchronization marker to said second network connection.

5. The intermedia synchronization system as claimed in claim 1, further comprising:

audio receiving means coupling to said first network connection for receiving said marked audio frames; and video receiving means coupling to said second network connection for receiving said marked video frames.

6. The intermedia synchronization system as claimed in claim 1, further comprising:

an audio smoother for determining an adaptive buffering delay imposed on each talkspurt and regulating the departure time of each of said audio frame.

7. The intermedia synchronization system as claimed in claim 1, further comprising:

an audio decoder for receiving synchronized audio frames output from said synchronization forcer and generating regular audio signals; and an video decoder for receiving synchronized video frames output from said synchronization forcer and generating regular video signals.

8. The intermedia synchronization system as claimed in claim 1, further comprising:

demultiplexing means at said transmitting site for receiving multimedia data streams and generating a plurality of audio frames and a plurality of video frames.

9. The intermedia synchronization system as claimed in claim 1, wherein said marking interval includes a grace period and each frame within said grace period has the same sequential mark.

10. The intermedia synchronization system as claimed in claim 1, wherein said video frames and said audio frames follow MPEG formats.

11. An intermedia synchronization system for communicating multimedia data streams between a transmitting site and a receiving site over a computer network, said multimedia data streams consisting of at least audio frames and video frames, comprising:

a synchronization marker at said transmitting site for generating marks for each of audio frames and video frames in response to a minimum marking interval for a bounded skew requirement, and outputting said marked audio frames and said marked video frames, wherein said marking interval based on the arrival time of each audio frame;

audio sender coupling to a first network connection for forwarding said marked audio frames output from said synchronization marker to said first network connection;

video sender coupling to a second network connection for forwarding said marked video frames output from said synchronization marker to said second network connection;

audio receiving means at said receiving site for coupling to said first network connection for receiving said marked audio frames;

video receiving means at said receiving site for coupling to said second network connection for receiving said marked video frames;

a synchronization forcer at said receiving site for buffering said marked audio frames and said marked video frames based on the arrival time of each of said marked audio frames and rearranging the display sequences of said marked audio frames and said marked video frames according to their sequential marks;

an audio decoder for receiving synchronized audio frames from said synchronization forcer and generating regular audio signals; and an video decoder for receiving synchronized video frames from said synchronization forcer and generating regular video signals.

12. The intermedia synchronization system as claimed in claim 11, wherein said first connection and said second connection are Constant Bit Rate network connections.

13. The intermedia synchronization system as claimed in claim 11, wherein said first connection and said second connection are Variable Bit Rate network connections.

14. The intermedia synchronization system as claimed in claim 11, further comprising:

an audio smoother for receiving said marked audio frames from said audio receiving means and determining an adaptive buffering delay imposed on each talkspurt and regulating the departure time of each of said audio frame.

15. The intermedia synchronization system as claimed in claim 11, wherein said marking interval includes a grace period and each frame within said grace period has the same sequential mark.

16. The intermedia synchronization system as claimed in claim 11, wherein said video frames and said audio frames follow MPEG formats.

17. The intermedia synchronization system as claimed in claim 11, further comprising:

demultiplexing means at said transmitting site for receiving multimedia data streams and generating a plurality of audio frames and a plurality of video frames.

* * * * *